United States Patent
Palanisamy et al.

(10) Patent No.: US 12,493,536 B2
(45) Date of Patent: Dec. 9, 2025

(54) AUTONOMOUS SYSTEM TO DETECT AND ADDRESS FILE SYSTEM UNAVAILABILITY OR CORRUPTION

(71) Applicant: Dell Products L.P., Round Rock, TX (US)

(72) Inventors: Kumaravel Palanisamy, Bangalore (IN); Rashmi Shashidhar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 18/601,248

(22) Filed: Mar. 11, 2024

(65) Prior Publication Data

US 2025/0284603 A1 Sep. 11, 2025

(51) Int. Cl.
*G06F 11/20* (2006.01)
*G06F 9/455* (2018.01)
*G06F 16/182* (2019.01)

(52) U.S. Cl.
CPC ...... *G06F 11/2028* (2013.01); *G06F 16/1827* (2019.01); *G06F 16/1844* (2019.01); *G06F 9/45545* (2013.01)

(58) Field of Classification Search
CPC ............. G06F 11/2028; G06F 16/1833; G06F 16/1827; G06F 9/45545
See application file for complete search history.

(56) References Cited

U.S. PATENT DOCUMENTS

| | | | |
|---|---|---|---|
| 9,633,051 B1* | 4/2017 | Maccanti | G06F 11/1464 |
| 2007/0234115 A1* | 10/2007 | Saika | G06F 11/2028 |
| | | | 714/13 |
| 2013/0067188 A1* | 3/2013 | Mehra | G06F 3/0689 |
| | | | 711/170 |
| 2013/0290962 A1* | 10/2013 | Hu | G06F 9/45558 |
| | | | 718/1 |
| 2017/0235758 A1* | 8/2017 | Gopalapura Venkatesh | |
| | | | G06F 16/1844 |
| | | | 707/625 |

* cited by examiner

*Primary Examiner* — Ashish Thomas
*Assistant Examiner* — Bryan P Huang
(74) *Attorney, Agent, or Firm* — Daly, Crowley, Mofford & Durkee, LLP

(57) ABSTRACT

A method for use in a storage system, comprising: generating a replication configuration list for a first guest operating system, the replication configuration list identifying each of a plurality of Network Attached Storage (NAS) servers that are executed in the first guest operating system; detecting a file system failure event that is associated with a failed file system, the failed file system being associated with a data volume, the failed file system being provided by a first NAS server; identifying a file system identifier that is associated with the failed file system; detecting whether the first NAS server is replicated based on the replication configuration list; and in response to detecting that the first NAS server is replicated, performing a failover for the data volume to a second NAS server that is arranged to provide a file system for a replica of the data volume.

18 Claims, 11 Drawing Sheets

| NAS SERVER ID | REPLICATION SESSION INFO | IP ADDRESS | ROLE |
|---|---|---|---|
| 453 NAS_ID_1 | 455 INFO_1 | 457 10.1.2.3 | 459 ACTIVE |
| 453 NAS_ID_2 | 455 INFO_1 | 457 20.1.2.3 | 459 ACTIVE |
| 453 NAS_ID_3 | 455 INFO_1 | 457 30.1.2.3 | 459 PASSIVE |

FIG. 4C

AUTONOMOUS SYSTEM TO DETECT AND ADDRESS FILE SYSTEM UNAVAILABILITY OR CORRUPTION

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for use in a storage system, comprising: generating a replication configuration list for a first guest operating system, the replication configuration list identifying each of a plurality of Network Attached Storage (NAS) servers that are executed in the first guest operating system; detecting a file system failure event that is associated with a failed file system, the failed file system being associated with a data volume, the failed file system being provided by a first NAS server; identifying a file system identifier that is associated with the failed file system; detecting whether the first NAS server is replicated based on the replication configuration list; and in response to detecting that the first NAS server is replicated, performing a failover for the data volume to a second NAS server that is arranged to provide a file system for a replica of the data volume, wherein performing the failover includes causing the storage system to begin routing I/O requests for the data volume to the second NAS server.

According to aspects of the disclosure, a computing device is provided, comprising: a memory; and at least one processor that is operatively coupled to the memory, the at least one processor being configured to perform the operations of; generating a replication configuration list for a first guest operating system, the replication configuration list identifying each of a plurality of Network Attached Storage (NAS) servers that are executed in the first guest operating system; detecting a file system failure event that is associated with a failed file system, the failed file system being associated with a data volume, the failed file system being provided by a first NAS server; identifying a file system identifier that is associated with the failed file system; detecting whether the first NAS server is replicated based on the replication configuration list; and in response to detecting that the first NAS server is replicated, performing a failover for the data volume to a second NAS server that is arranged to provide a file system for a replica of the data volume, wherein performing the failover includes causing a storage system of which the system is part to begin routing I/O requests for the data volume to the second NAS server.

According to aspects of the disclosure, a non-transitory computer-readable storage medium that is configured to store one or more processor-executable instructions, which when executed by at least one processor, cause the processor to perform the operations of: generating a replication configuration list for a first guest operating system, the replication configuration list identifying each of a plurality of Network Attached Storage (NAS) servers that are executed in the first guest operating system; detecting a file system failure event that is associated with a failed file system, the failed file system being associated with a data volume, the failed file system being provided by a first NAS server; identifying a file system identifier that is associated with the failed file system; detecting whether the first NAS server is replicated based on the replication configuration list, the first NAS server providing the failed file system; and in response to detecting that the first NAS server is replicated, performing a failover for the data volume to a second NAS server that is arranged to provide a file system for a replica of the data volume, wherein performing the failover includes causing a storage system of which the at least one processor is part to begin routing I/O requests for the data volume to the second NAS server.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 4C is a diagram of a configuration builder list, according to aspects of the disclosure;

DETAILED DESCRIPTION

A storage system, such as the PowerMax™ line of storage systems, may utilize its data replication capability to enable both synchronous and asynchronous replication modes at the Network-Attached Storage (NAS) server level. In many conventional replication designs, filesystem unavailability or corruption is not detected and recovered from automatically. Rather, when a file system goes offline, this requires a service technician to look at the issue and apply the recovery procedure through internal commands. The need to perform manual failover when a file system fails could have a significant detrimental impact on the availability of the file system and even cause the availability goals for the storage system to be violated.

Figure 1A:
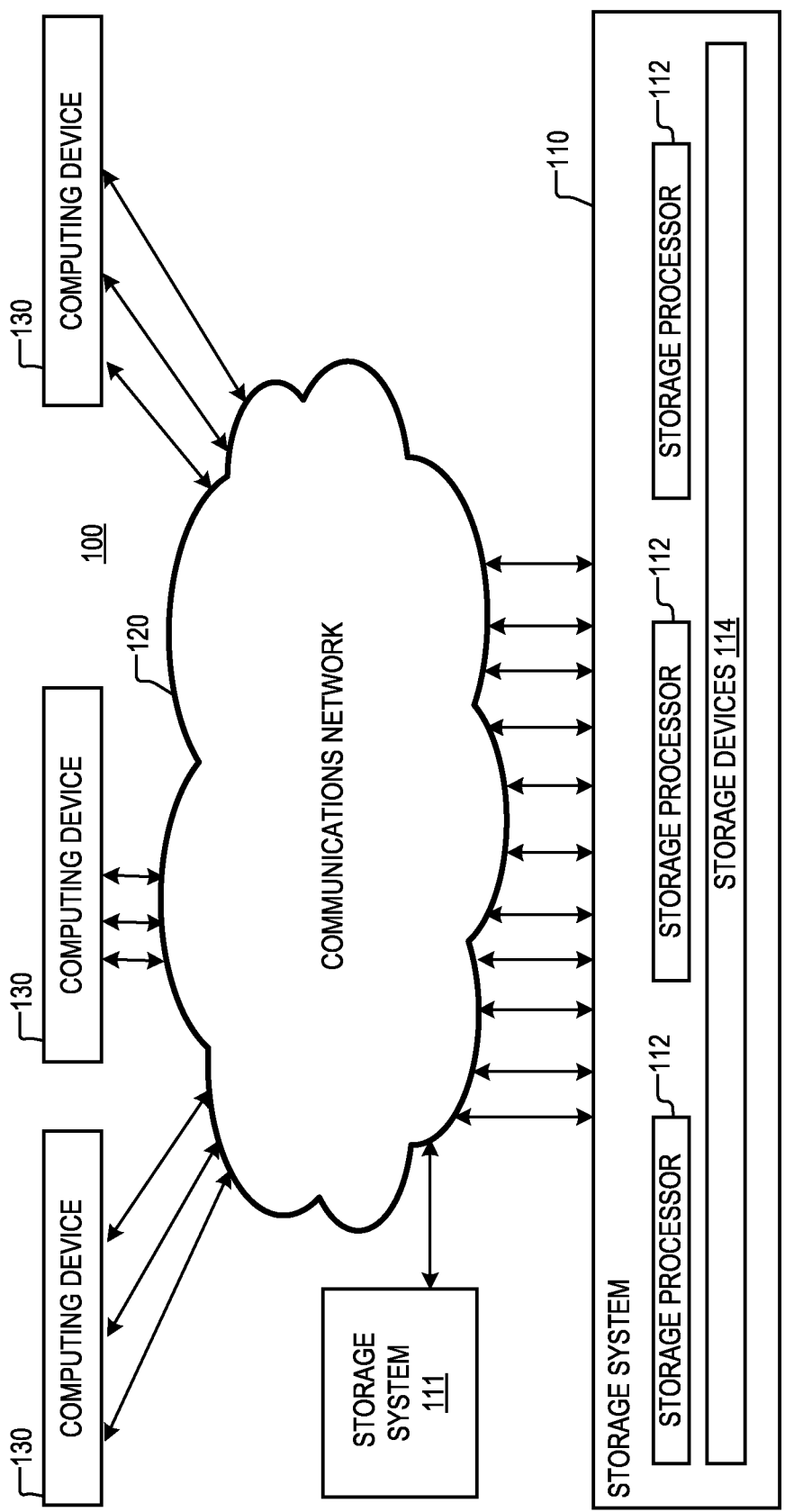
FIG. 1A is a diagram of an example of a system, according to aspects of the disclosure.

FIG. 1A is a diagram of an example of a system 100, according to aspects of the disclosure. As illustrated, system 100 may include a storage system 110, a storage system 111, a communications network 120, and a plurality of computing devices 130. The communications network 120 may include one or more of a fibre channel (FC) network, the Internet, a local area network (LAN), a wide area network (WAN), and/or any other suitable type of network. The storage system 110 may include a storage system, such as Dell Technologies Powermax™, DELL PowerStore™, and/or any other suitable type of storage system. The storage system 110 may include a plurality of storage processors 112 and a plurality of storage devices 114. Each of the storage processors 112 may include a computing device, such as the computing device 600, which is discussed further below with respect to FIG. 6. Each of the storage processors 112 may be configured to receive I/O requests from computing devices 130 and execute the received I/O requests by reading and/or writing data to storage devices 114. Each of the storage devices 114 may include one or more of a solid-state drive (SSD), a hard disk (HD), a non-volatile random-access memory (NVRAM) device, a non-volatile memory express (NVMe) device, and/or any other suitable type of storage device. Storage system 111 may have the same or similar configuration as storage system 110.

Figure 1B:
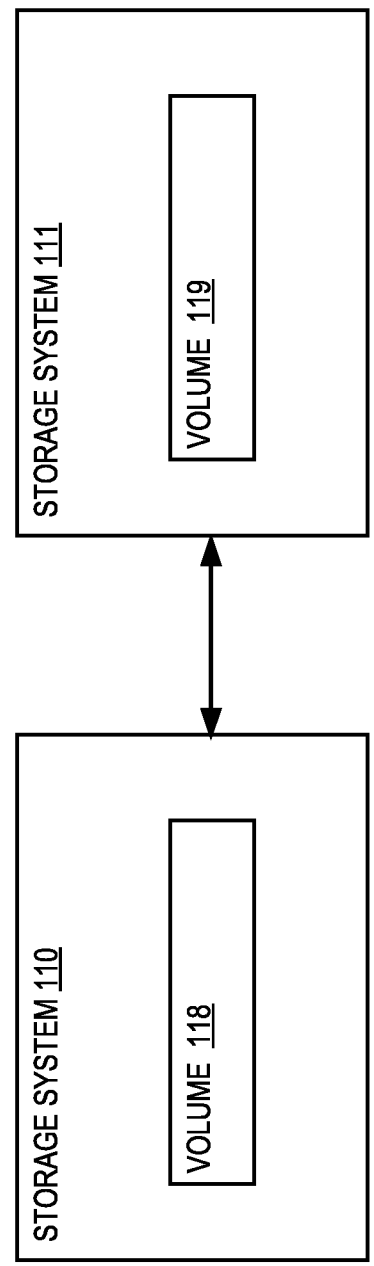
FIG. 1B is a diagram illustrating aspects of the operation of the system of FIG. 1A, according to aspects of the disclosure.

FIG. 1B illustrates aspects of the operation of storage systems 110 and 111, according to one example. As illustrated, storage system 110 may host a data volume 118. Volume 118 may be stored on one or more of storage devices 114. Furthermore, storage system 111 may host a data volume 119. Volume 119 may be stored on one or more storage devices that are part of storage system 111 (not shown). Volume 119 may be a replica of volume 118. Volume 119 may be created, and maintained, by using a data replication facility. The data replication facility may include one or more processes that are executed on any of the storage processors 112 in storage system 110. The data replication facility may be configured to write any data that is stored in volume 118 to volume 119. Furthermore, the data replication facility may be configured to delete from volume 119 any data that is deleted from volume 118. Stated succinctly, the data replication facility may be configured to maintain volumes 118 and 119 in a synchronized state. Volumes 118 and 119 may be assigned the same file system identifier and separate partition (or device) identifiers.

In some implementations, system 100 may include a file control network that is used for replication control communication. The file control network may facilitate dedicated communication between source (e.g., storage system 110) and destination (e.g., storage system 111) for replication workflows. The file control network N+1 interface, with one master IP address each storage system plus a different dedicated IP address for each NAS server of the mirror copy of the volume that is being replicated to storage system 111.

An input-output (I/O) request associated with any of the volumes 118 and 119 may include a file system ID, as well as identifiers of one or more files or directories that are associated with the I/O request. The I/O request may be received at a multipath agent (or another similar entity) that is provided in system 100. The multipath agent may then identify a NAS server that provides a file system corresponding to the file system ID, and forward the I/O request to the identified NAS server. Next, the NAS server may instruct one or more processes that implement the block layer of system 100 to retrieve and/or store data from the LBAs as necessary to complete the I/O request. Next, the NAS server may update one or more file system data structures to reflect any changes that were made to the data stored in volumes 118 and 119. And finally, the NAS server may acknowledge the I/O request and/or return any data that is requested by the I/O request to the sender of the I/O request.

As used herein, the term "volume" refers to a storage area where data is stored. Volume 118 may be associated with a file system that is provided by a NAS server. The NAS server may act as a file server for the volume, in that it may read and write data to the volume in response to I/O requests, as well as manage the data structures that constitute the volume's file system. The NAS server for volume 118 may read and write data to volume 118. Any changes that are made to volume 118 by the NAS server may be subsequently propagated to volume 119 by a data replication facility that is provided in storage system 110. When new data is stored in volume 118, the data replication facility may copy the new data to volume 119 as well; when data is deleted from volume 118, the data replication facility may delete the same data from volume 119.

When the file system for volume 118, that is hosted on a NAS server in storage system 110, goes offline, a failover to volume 119 may need to be performed. In one implementation, the failover may include one or more of: (i) bringing into production mode a remote NAS server that provides a file system for volume 119, and (ii) causing system 100 to route requests I/O requests associated with file system identifier (that is shared between volumes 118 and 119), to the remote server. The remote NAS server for volume 119 may be already running in storage system 111 (in standby mode), ready to take over in the event of a failure of the NAS server in storage system 110 that provides the file system for volume 118 (or in the event of the file system for volume becoming unavailable for a reason other than a NAS server failure). The remote NAS server In some implementations, a frontend of a storage system (e.g., a multipath agent) at which I/O requests are initially received may be configured to stop routing I/O requests associated with the file system identifier that is shared between volumes 118 and 119 to the NAS server that is no longer available (i.e., the NAS server for volume 118) and begin routing I/O requests associated with the file system identifier to the remote NAS server. As used herein, the phrase "routing I/O requests to a NAS server" may include any action that causes the NAS server to be at least partially used in the execution of the I/O requests. The I/O requests may include read requests, write requests, and or any other suitable input-output (I/O) request.

A file system may be brought offline for one of the following reasons. Specifically, the file system may go offline in response to an I/O timeout from the underlying block storage. Alternatively, the file system may go offline when a file system error is detected. The file system error may be caused by the SDNAS layer that is underlying the file system, or by an in-memory or on-disk failure. Throughout the disclosure, the terms "volume ID" and "file system ID" are used interchangeably. Stated succinctly, the term file system identifier may be any suitable type of identifier that is associated with at least one volume. When the volume is replicated, the file system identifier may be associated with both the volume and the volume's replica.

As used herein, the phrase "performing a failover from volume 118 to volume 119" shall mean causing all I/O requests containing the file system identifier shared between volumes 118 and 119 to be routed to a NAS server that provide a file system for volume 119. When volumes 118 and 119 are operated in an active-active configuration (e.g., when the roles of volumes 118 and 119 are both active), some of the I/O requests for the file system identifier may be routed to NAS server(s) associated with volume 118 and the rest may be routed to NAS server(s) associated with volume 119. In this case, the failover from volume 118 to volume 119 may include stopping to route any I/O requests for the file system identifier to NAS server associated with volume 118 and beginning to route all requests for the file system identifier to the NAS server associated with volume 119. When volumes 118 and 119 are operated in active-passive configuration (e.g., when the role of volume 118 us active and the role of volume 119 is passive), I/O requests for the file system identifier may be routed only to NAS server associated with volume 118. In this case, the failover from volume 118 to volume 119 may include stopping to route any I/O requests for the file system identifier to NAS server associated with volume 118 and beginning to route all requests for the file system identifier to the NAS server(s) associated with volume 119. Depending on the system configuration, the NAS server(s) associated with volume 119 may be moved to production mode as part of the planned failover.

Figure 2:
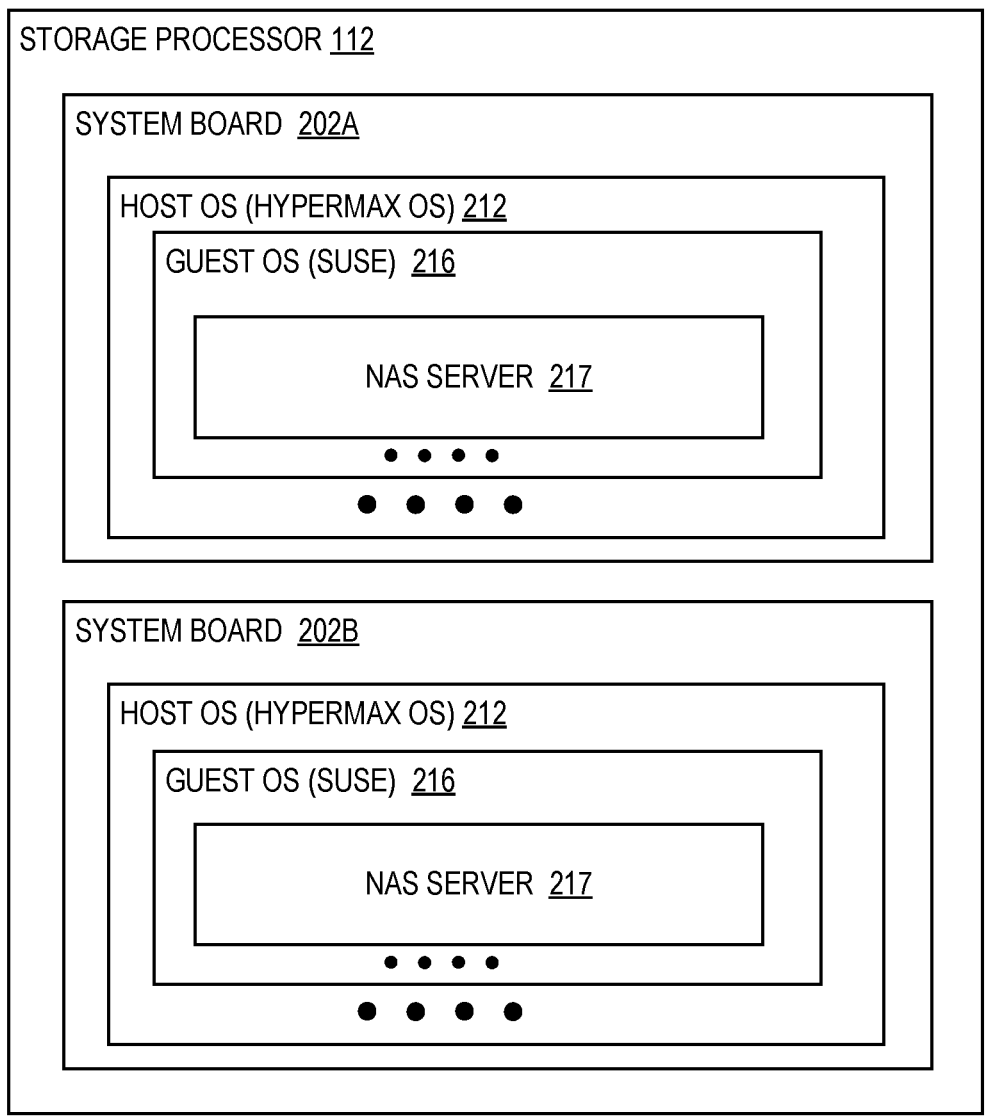
FIG. 2 is a diagram of an example of a storage processor, according to aspects of the disclosure.

FIG. 2 is a diagram of a storage processor 112, according to one possible implementation. In some implementations, each of the storage processors 112 in the storage system 110 (and/or storage system 111) may have the configuration that is shown in FIG. 2. As illustrated, the configuration of a storage processor 112, which is shown in FIG. 2 may include system boards 202A and 202B. Each of system boards 202A and 202B may include a motherboard, a processor (e.g., an x86 processor or a MIPS processor, etc.), a memory (e.g., Double Data Random Access Memory (DDRAM), etc.), and/or any other suitable type of component. Each of the system boards 202A and 202B may be configured to execute a respective host operating system (OS). Inside each respective host operating system 212, guest operating systems 212 may be executed. In the present example, each of the guest operating systems 216 is a SUSE Linux™ operating system, however, the present disclosure is not limited to using any specific type of operating system being used. Inside each guest operating system (OS) 216, one or more respective NAS servers 217 may be executed. Each of the NAS servers 217 may host one or more file systems for accessing respective data volumes. Each of the NAS servers 217 may act as a file server, and it may have access to shared system resource pools of storage system 110 so that they can easily consume system resources for both performance and capacity. Each of the NAS servers 217 may be given a different Internet Protocol (IP) address.

Figure 3:
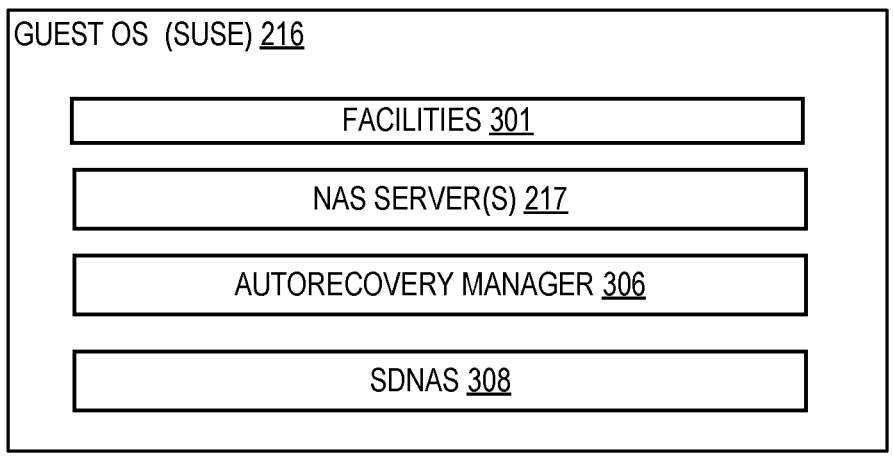
FIG. 3 is a diagram of an example of guest operating system instance, according to aspects of the disclosure.

FIG. 3 is a diagram of an example of a guest OS 216, according to aspects of the disclosure. In the example of FIG. 3, guest OS 216 may be configured to execute one or more facilities 301, NAS servers 217, an auto-recovery manager 306, and a respective SDNAS layer 308.

Facilities 301 may include one or more Network Attached Storage (NAS) facilities. Each of the facilities 301 may be executed within a respective guest operating system, and its responsibilities may be dependent on the operations that are performed on the NAS server. It may be an API utilized by the NAS server to perform its functions.

The SDNAS layer 308 may be configured to provide file systems, snapshot generation services, and naming services, such as Domain Name Service (DNS), Lightweight Directory Access Protocol (LDAP), Network Information Service (NIS), etc. Furthermore, the SDNAS layer 308 may provide a communication protocol stack and/or one or more network protocols, such as Samba (SMB), File Transfer Protocol (FTP), Network File System (NFS), or Secure FTP (SFTP). In some implementations, the SDNAS layer may include an embedded software-defined network-accessible storage (NAS) solution offering reliable, highly available, scale-out, high-performance, 64-bit file system facility. In some implementations, the SDNAS layer 308 may provide an API that is used by NAS servers 217 for performing their functions.

The auto-recovery manager 306 may include one or more processes for performing failover from a NAS server hosting a failed file system to a replication NAS server. The auto-recovery manager 306 may be implemented in software, in hardware, or as a combination of software and hardware.

Figure 4A:
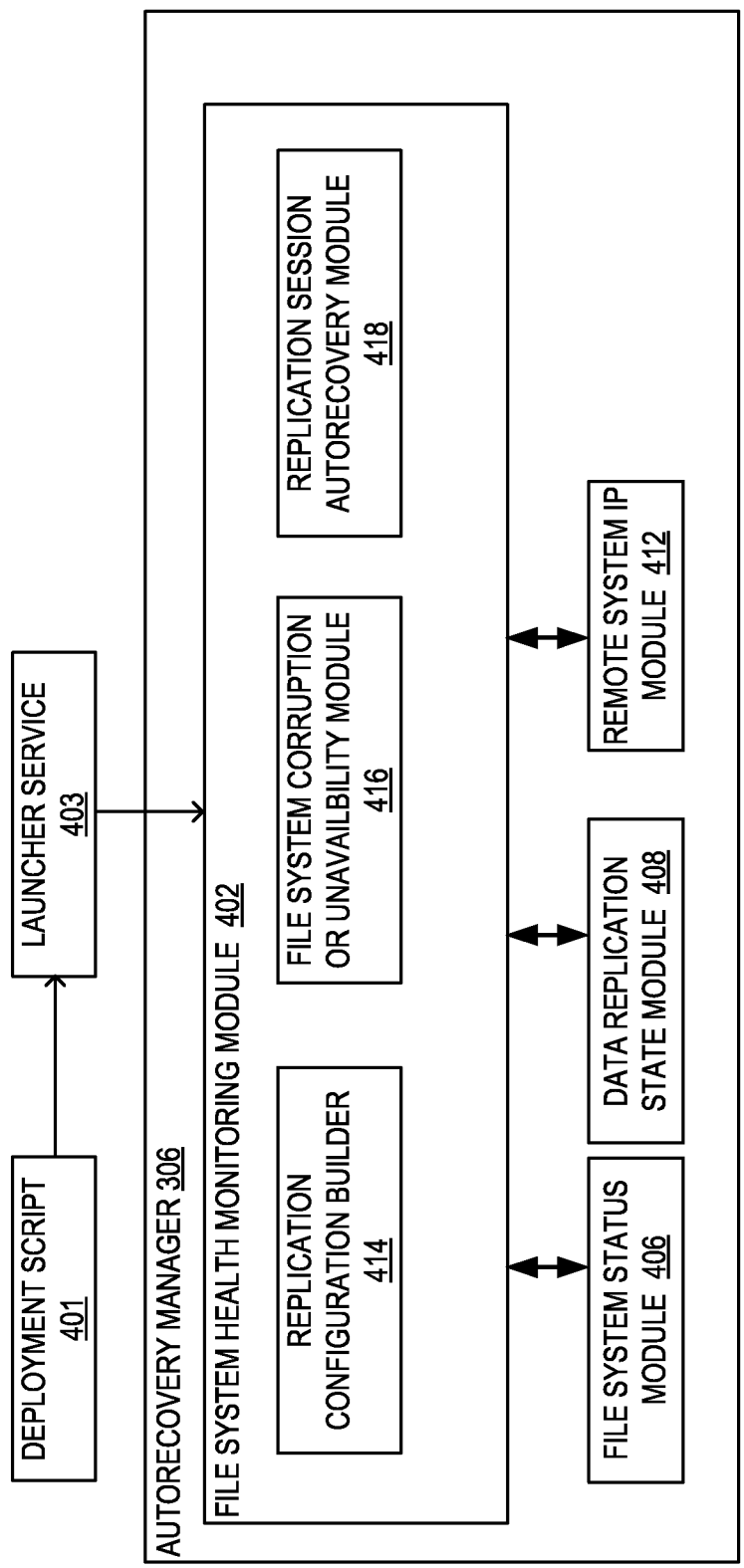
FIG. 4A is a diagram of an example an auto-recovery manager, according to aspects of the disclosure.

FIG. 4A is a diagram of an example of auto-recovery manager 306. According to the present example, auto-recovery manager 306 may be deployed by using a deployment script 401 and a launcher service 403. As illustrated, auto-recovery manager 306 may include a file system health monitoring module 402, a file system status module 406, a data replication state module 408, a data protection network IP module 410, and a remote system IP module 412.

Figure 4B:
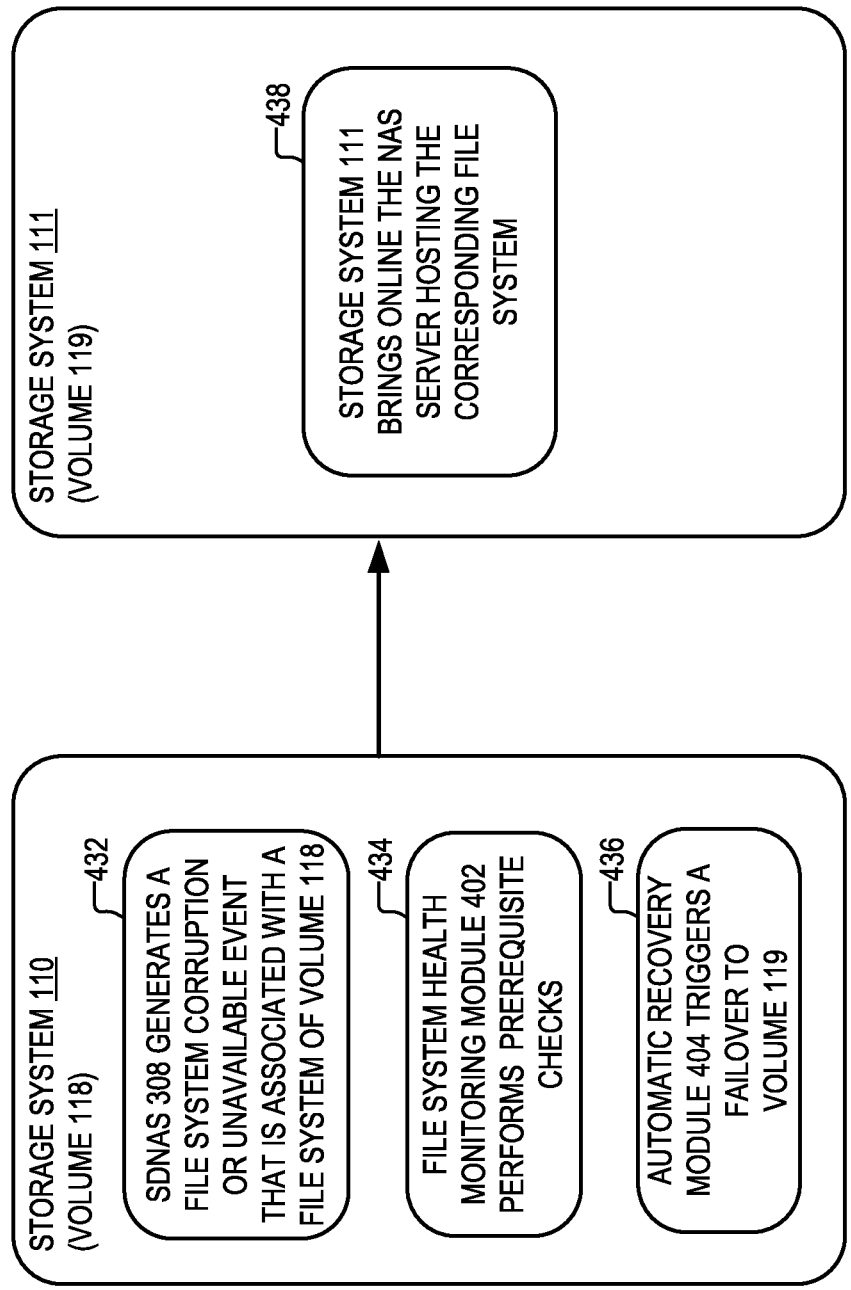
FIG. 4B is a diagram illustrating aspects of the operation of the auto-recovery manager of FIG. 4A an auto-recovery manager, according to aspects of the disclosure.

An example of the operation of auto-recovery manager 306 is now provided with respect to FIG. 4B. As illustrated in FIG. 4B, at step 432, SDNAS layer 308 generates an event that signals that the file system for volume 118 is offline. The event may be a file system corruption or unavailable event. At step 434, module 402 performs a series of checks that are intended to determine whether a successful failover may be performed to volume 119. As is discussed further below with respect to FIGS. 5A-B, the checks may include detecting whether volume 118 is at all being replicated, whether the states of volume 118 and its potential replica are synchronized, whether storage system 111 is reachable, and so forth. At step 436, assuming that the checks at step 434 are passed, auto-recovery manager 306 triggers a failover from volume 118 to volume 119. At step 438, storage system 111 brings online a NAS server that provides a file system for volume 119.

Returning to FIG. 4A, deployment script 401 may be a script for deploying one or more guest operating systems 216. Deployment script 401 may include information about auto-recovery manager 306, which would cause auto-recovery manager 306 to be deployed in every guest OS that is instantiated as a result of deployment script 401 being executed. Auto recovery manager 306 may be listed as a CRM resource in the deployment script 401.

Launcher service 403 may execute deployment script 401 and launch auto-recovery manager 306 as a result. Launcher service 403 may be a system service file which will start the auto-recovery manager 306 upon system boot, post install or upgrade. By implementing auto-recovery manager 306 as a system service, auto-recovery manager 306 is guaranteed to be failed over as part of local node failover.

File system status module 406 may be configured to detect any events that signal that a file system that is associated with a volume (e.g., volume 118) has been brought offline. According to the nomenclature of the present disclosure, such events are also referred to as file system failure events. In addition to signaling that a particular file system is unavailable, a file system failure event may also signal that the NAS server that provides the file system is also unavailable. Furthermore, file system status module 406 may be configured to notify module 402 of any file system failure events that are generated in storage system 110 and forward the file system failure events to module 402. In some implementations, file system status module 406 may be configured to detect events that are generated by the SDNAS layer 308. Additionally or alternatively, in some implementations, file system status module 406 may be configured to detect FS_UNMOUNTED_ CORRUPTION_DETECTED and FS_UNMOUNTED_IO_ERROR events. FS_UNMOUNTED_IO_ERROR events may be generated when an I/O timeout is generated in storage system 110 that is caused by a side error. FS_U- MOUNTED_CORRUPTION_DETECTED events may be generated when file system corruption is caused by the SDNAS layer 308 and/or when in-memory or on-disk corruption of volume 118 is detected.

Data replication state module 408 may be configured to detect whether the state of a volume and its replica (e.g., mirror copy) are consistent. For example, when the file system (or corresponding NAS server) of volume 118 goes offline, data replication module 408 may detect whether the states of volumes 118 and 119 are consistent. Furthermore, data replication state module 408 may be configured to provide the file system health monitoring module 402 with an indication of whether the states of volumes 118 and 119 are consistent. In some implementations, the states of volumes 118 and 119 are considered to be consistent when the data in volume 118 is identical to the data in volume 119.

Data protection network IP module 410 may be configured to detect whether the replica is available of a volume that is associated with a file system failure event. For example, when the file system (or corresponding Nas server) of volume 118 goes offline, module 410 may be configured to detect whether storage system 111 and/or volume 119 is available.

Remote system IP module 412 may be configured to provide any information for connecting to the storage system where a volume replica is hosted. The master IP of the storage system 111 may be used to find out whether the remote replication system is alive. In the example of FIG. 1B, if volume 118 fails, module 412 may ping storage system 111 (because this is where volume 119, which is a replica of volume 118, is stored). In some implementations, data protection IP module 412 may be configured to provide an internal heartbeat for the storage system where the volume replica is stored, and it can be used to determine whether a failover to the replica volume would be impeded by unavailability of the storage system where the volume replica is stored.

The file system health monitoring module 402 may include a replication configuration builder 414, a file system corruption or unavailability module 416, and an auto-recovery module 418.

Replication configuration builder 414 may generate a list 450, an example of which is shown in FIG. 4C. List 450 may identify a plurality of volumes that are being replicated. As illustrated, list 450 may include a plurality of entries 452 that are associated with the volumes that are being replicated. Each entry may correspond to a different volume that is being replicated. Each entry 452 may include fields 453, 455, 457, and 459. In any given entry 452, field 453 may include a NAS server identifier; field 455 may include replication session ID for the given entry's corresponding volume; field 457 may include the IP address of a remote storage system where a replica of the entry's corresponding volume is stored, and field 459 may include an indication of the role of the entry's corresponding volume. According to the present example, the replication of a volume/file system in storage system 110 is not based on the volume/file system. Rather, the replication is based on the NAS server that provides the file system for the volume (i.e., the replication of volumes in system 100 is performed on a per-NAS server basis). Each NAS server may be assigned a replication session id, which is used for replicating all file systems that are hosted by the NAS server (i.e., for replicating the volumes corresponding to the file systems hosted by the NAS server). When the list 450 is being built, the configuration builder 414 may look for the replication session ID of each (or at least one) of the NAS servers that are executed in the same guest OS as the configuration builder 414, which would implicitly cover the file systems provided by those NAS servers also.

Although not shown, in some implementations, for each of the NAS servers identified in the list 450, the list 450 may identify a different respective set of one or more file systems that are hosted on that file server. Furthermore, for any of the file systems that is replicated, the list 450 may identify the IP address of the NAS server that is hosting the volume's replica. It will be understood that the present disclosure is not limited to any specific implementation of the list 450.

In some implementations, configuration builder 414 may generate the list 450 as soon as configuration builder 414 (and/or auto-recovery manager 306) is started. After list 450 is generated, configuration builder 414 may monitor the events that are generated by the data replication facility of storage system 110. Specifically, configuration builder 414 may detect a first type of event and a second type of event. Each event from the first type may be an event that signals that a new replication session is started for a NAS server that hosts a file system/volume, as a result of which the NAS server (or the volume(s) whose file systems are hosted by the NAS server) would begin to be replicated. Each event from the second type may be an event indicating that an existing replication session has been terminated, as a result of which the replication of one of the NAS servers in list 450 (and/or the replication of the volume(s) whose file systems are hosted on the NAS server) has stopped.

When any of the events from the first type is detected, the configuration builder 414 may retrieve a replication session identifier (or a NAS server identifier) from the event. Next, the configuration builder 414 may create a new entry 452 containing the identifier of the NAS server that corresponds to the replication session ID and add the new entry to the list 450. In this example, the NAS server corresponding to the replication session ID is the NAS server whose file systems are replicated by the replication session having the replication session ID. The new entry may also contain other information associated with the NAS server and/or replication session, such as the information stored in fields 455 and 457. The other information may be retrieved from the event or retrieved from the data replication layer of storage system 110 based on information contained in the event (e.g., based on the file system identifier, etc.).

When any of the events from the second type is detected, the configuration builder 414 may retrieve a NAS server identifier from the event (or otherwise obtain the identifier of the NAS server corresponding to the ID of the replication session that has been terminated). Afterwards, the configuration builder 414 may identify an entry that corresponds to the retrieved NAS server identifier and remove the entry from list 450.

In some implementations, the list 450 may include only entries that correspond to NAS servers that are executed in the same guest OS as configuration builder 414. In other words, in some implementations, none of the entries 452 in the list 450 may be associated with a NAS server that is executed outside of the guest OS where the instance of configuration builder 414 that generated the list 450 is executed. In some implementations, each guest operating system in a storage processor may execute its own instance of configuration builder 414, which would generate (and/or manage) a replication configuration list that is local to that guest operating system. The configuration list may be the same or similar to the list 450, and it may include only entries that correspond to NAS servers executed in the same guest operating system as the configuration builder instance that generated the configuration list.

Module 416 may use the file system status module 406 to monitor the events generated by the SDNAS layer 308 and may take the following actions upon receiving an FS_UNMOUNTED_CORRUPTION_DETECTED or FS_UNMOUNTED_IO_ERROR event. As noted above, these events are file system failure events that signal that a NAS server associated with a volume has gone offline or is otherwise unavailable.

Upon detecting one of these events, module 402 may obtain the identifier of the NAS server hosting the failed system. In one example, module 402 may retrieve an identifier of the failed file system and map the failed system identifier to an identifier of the NAS server that hosts the failed file system. As noted above, the identifier of the NAS server may be obtained by using the list 450 or another file. Next, module 402 may use module 408 to detect whether the volume associated with the file failed file system is a replicated volume. For example, module 402 may determine whether the NAS server is replicated. The determination may be made by performing a search of list 450 to determine whether any of the entries 452 in list 450 contains the NAS server identifier (in field 453). If one of the entries 452 in list 450 contains the NAS server identifier, module 402 may detect that the volume (and/or NAS server) is replicated. Otherwise, module 402 may detect that the volume is not replicated. Next, if the volume is replicated, module 402 may confirm if the remote storage system where the replica of the volume is hosted is accessible. Furthermore, module 402 may confirm whether the states of the unavailable volume (i.e., the volume associated with the failed file system), and its replica are consistent. And still furthermore, module 402 may confirm if the role of the volume that is associated with the event is active or passive. In some implementations, only if the remote storage system is accessible, the states if the unavailable volume and its replica are consistent, and the role of the volume is active, module 402 may detect that a failover can be performed from the unavailable volume to the unavailable volume's replica, and control may pass to the automatic recovery module 418. The automatic recovery module 418 may retrieve, from configuration builder 414 (or list 450), a replication session ID from the list 450, and use the retrieved replication session ID to perform a failover to the replica of the volume that has become unavailable. For instance, when the IP address of the NAS server providing a file system for the volume replica is not available in list 450, the replication session ID may be used to identify the IP address of the NAS server that is associated with the volume replica (because replication associated with the replication session ID may involve sending data to that IP address).

Figure 5A:
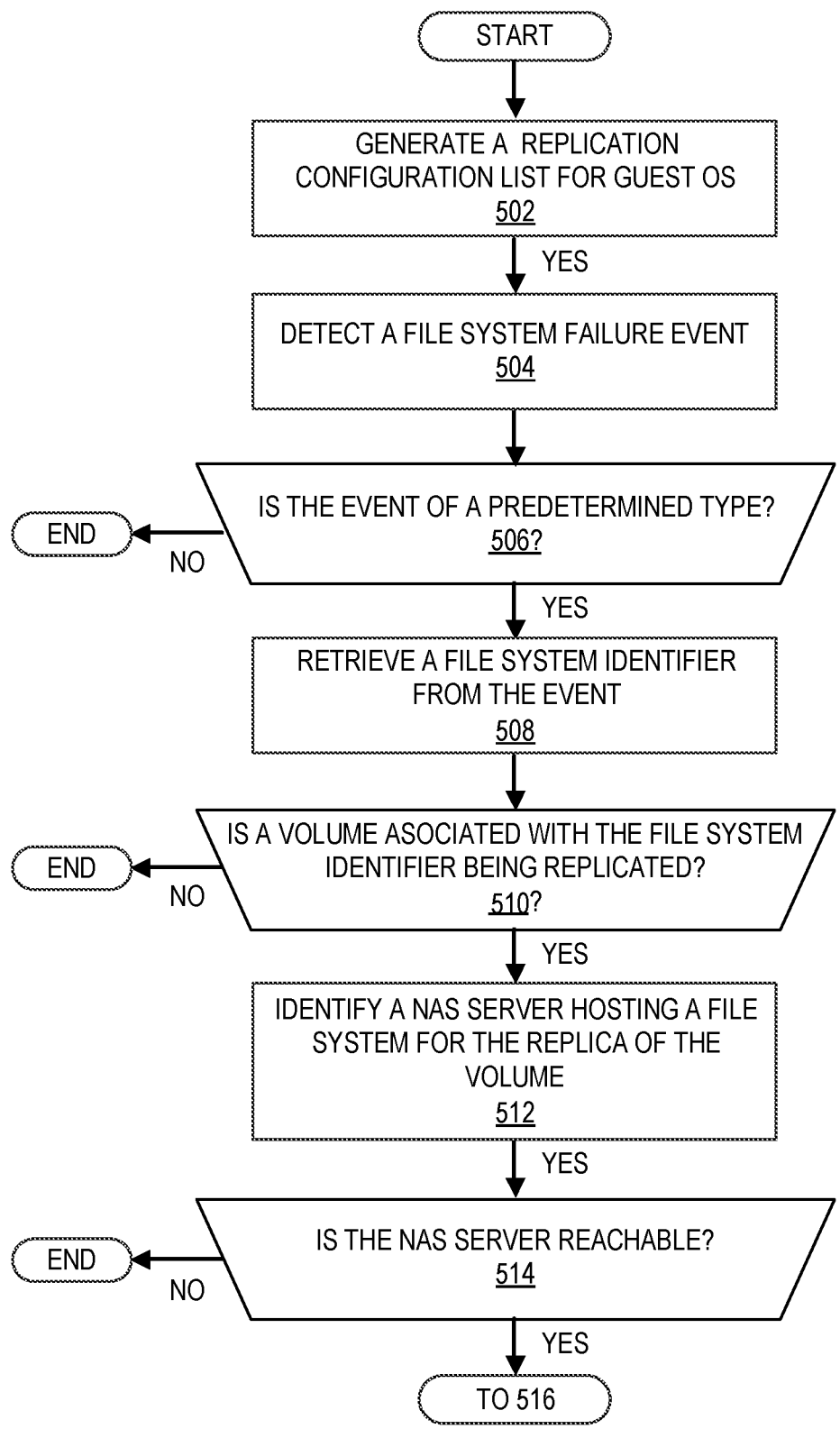
FIG. 5A is a flowchart of an example of a process, according to aspects of the disclosure.
Figure 5B:
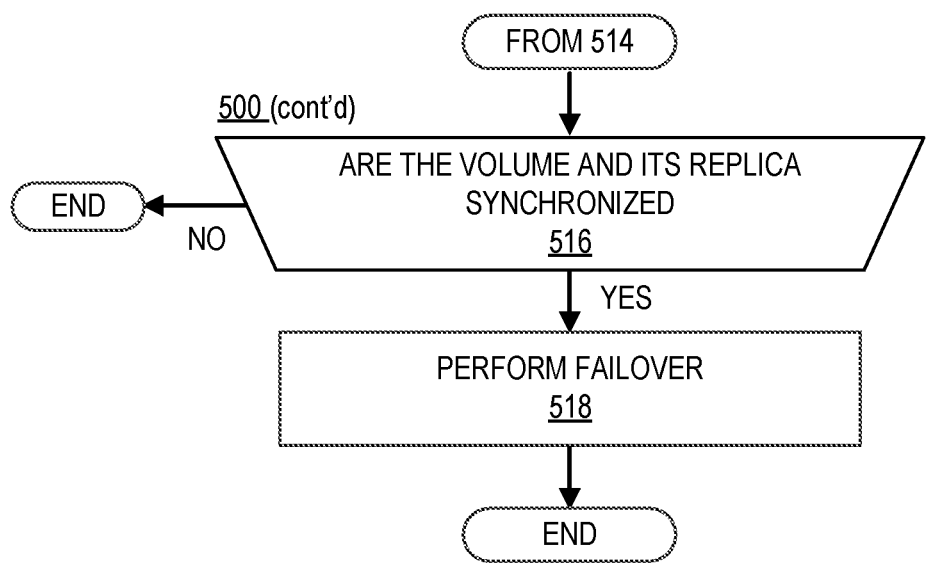
FIG. 5B is a flowchart of an example of a process, according to aspects of the disclosure.

FIGS. 5A-B show a flowchart of an example of a process 500, according to aspects of the disclosure. According to the example of FIGS. 5A-B, the process 500 is performed by the auto-recovery manager 306. However, the present disclosure is not limited to any specific entity performing the process 500.

At step 502, replication configuration builder 414 generates the list 450.

At step 504, the module 416 detects a file system failure event. Detecting the event may include receiving the event from file system status module 406.

At step 506, the module 416 detects whether the event is a predetermined type of event. According to the present example, module 416 detects whether the event is a FS_UNMOUNTED_CORRUPTION_DETECTED or FS_UNMOUNTED_IO_ERROR event. If the detected event is either an FS_UNMOUNTED_CORRUPTION_DETECTED event or FS_UNMOUNTED_IO_ERROR event, process 500 proceeds to step 508. Otherwise, process 500 ends.

At step 508, the module 416 retrieves a file system identifier from the event. As can be readily appreciated, the event may be a message and/or data structure that contains an indication of an error type as well as other information associated with the error.

At step 510, module 416 detects whether a volume associated with the file system failure event is currently being replicated. The file system failure event may be generated when a NAS server goes offline (or when the file system goes offline), and it may signal that the file system provided by the NAS server is no longer available (and possibly faulty). The volume associated with the file system failure event is a volume that corresponds to the file system identifier (contained in the event), which is hosted in the same storage system as the NAS server that is no longer available (and the storage system where the instance of auto-recovery manager 306 which performs process 500 is executed). Any volume that is hosted in a remote (or different) storage system, and which is associated with the same file system identifier, is a replica of the volume associated with the file system failure event. To perform step 510, module 416 carries a search of list 450 to determine whether any of the entries 452 in the list 450 corresponds to the NAS server that is (or was) hosting the failed file system. If the list 450 includes an entry corresponding to the NAS server, module 416 determines that the failed file system (or its corresponding NAS server) is being replicated, and process 500 proceeds to step 512. Otherwise, process 500 determines that the failed file system is not replicated. In the latter case, module 416 may generate a predetermined error (i.e., generate a predetermined error code) that signals that the file system failure needs to be handled in a conventional manner (i.e., without using the services of auto-recovery manager 306. It will be understood that the present disclosure is not limited to any specific method for determining whether the failed file system is replicated (i.e., for determining whether the volume corresponding to the failed file system is replicated). For example, in some instances, the determination of whether the volume is replicated may be performed without first finding the IP address of the NAS server that is hosting the failed file system. In such implementations, the determination of whether the volume is replicated may be performed by using a separate table that identifies which volumes in system 100 are currently replicated. Additionally or alternatively, module 416 may use the services of module 408 to determine whether the volume is replicated.

At step 512, module 416 identifies the IP address of a NAS server that is hosting a file system for the volume replica. In some implementations, module 416 may retrieve the IP address of the NAS server that provides a file system for the volume replica and use the retrieved IP address to bring the NAS server online. In some implementations, the IP address may be retrieved from a file where data protection network (dpNetwork) information and/or remote system IP addresses are stored. Specifically, module 416 may identify the entry in list 450 that corresponds to the file system identifier (retrieved at step 508), retrieve the IP address of IP address (e.g., master IP) of the remote system where the volume replica is hosted, and subsequently use the IP address of the remote file system to identify the IP address that is specifically allocated to the NAS server hosting the file system for the volume replica. Additionally or alternatively, the IP address of the NAS server providing the file system for the volume replica may be retrieved directly from the list 450. In instances in which the IP address of the NAS server is determined at step 510, step 512 may be omitted.

At step 514, module 416 determines if the IP address is active. According to the present example, module 416 pings the IP address and determines its response time. If the response time is below a predetermined threshold, module 416 determines that the IP address is active. If the IP address is determined to be active, process 500 proceeds to step 516. Otherwise, process 500 ends.

Additionally or alternatively, in some implementations, at step 514, module 416 may check a heartbeat signal that is exchanged between a local storage system where module 416 is executed (e.g., storage system 110) and a remote storage system where the volume is replicated (e.g., storage system 111). The heartbeat signal may be provided by the remote storage system to the local storage system (or it may be bidirectional). The heartbeat signal may be used to indicate that the remote (or local) storage systems are reachable. If the heartbeat check is successful, process 500 proceeds to step 516. Otherwise, process 500 ends.

At step 516, module 416 determines if the states are synchronized of the volume associated with the file system failure event and the volume's replica. According to the present example, module 416 uses the data replication state module 408 to determine if the states of the volume and its replica are synchronized. If the states are synchronized, process 500 proceeds to step 518. Otherwise, process 500 ends.

At step 518, auto-recovery module 418 performs a failover to the replica of the volume that is associated with the file system failure event.

Figure 5C:
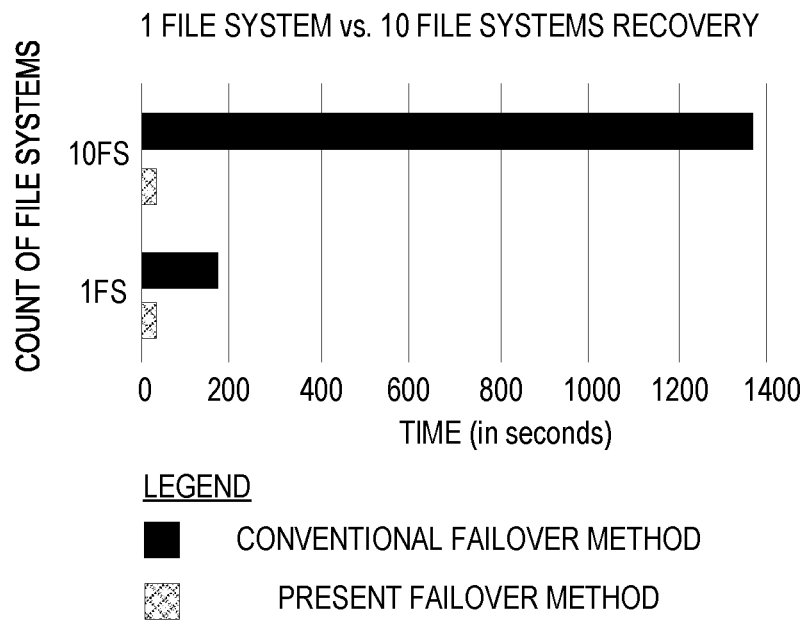
FIG. 5C is a graph illustrating the performance of the process of FIGS. 5A-B, according to aspects of the disclosure.
Figure 5D:
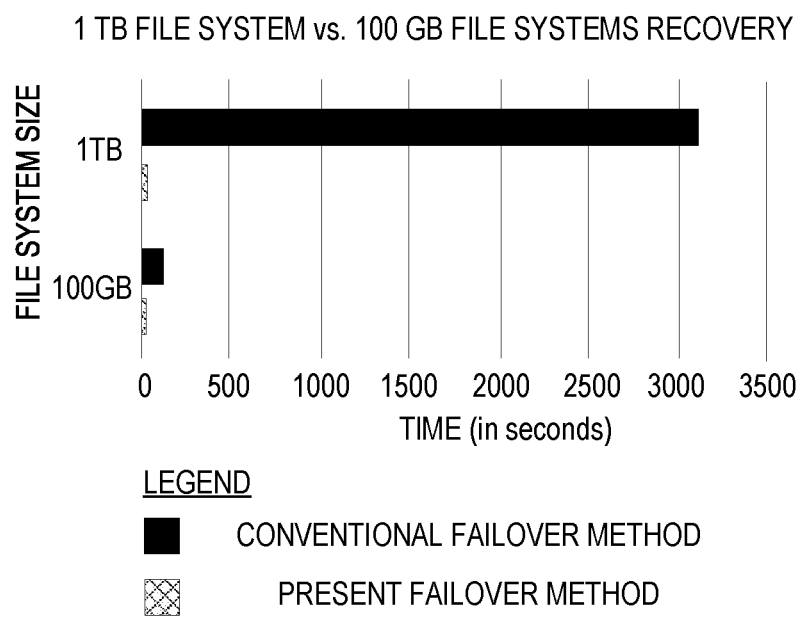
FIG. 5D is a graph illustrating the performance of the process of FIGS. 5A-B, according to aspects of the disclosure.

FIG. 5C is a graph illustrating the performance of process 500 in comparison to the conventional method for performing a failover. FIG. 5C illustrates that process 500 takes less than 100 seconds to perform an individual file system failover for 1 to 10 file systems, whereas the conventional method takes just under 200 seconds for 1 file system and over 1200 seconds for 10 file systems. FIG. 5D is a graph illustrating the performance of process 500 in comparison to the conventional method for performing a failover. FIG. 5D illustrates that process 500 takes less than 100 seconds to perform a switcher for a 100 GB file system, whereas the conventional method takes approximately four times more. FIG. 5D further illustrates that it takes under 100 seconds to perform a failover for a 1 TB file system, whereas the conventional method takes over 3000 seconds for this size file system. In the example of FIGS. 5C-D, the conventional method is the manual method which is discussed above.

Figure 6:
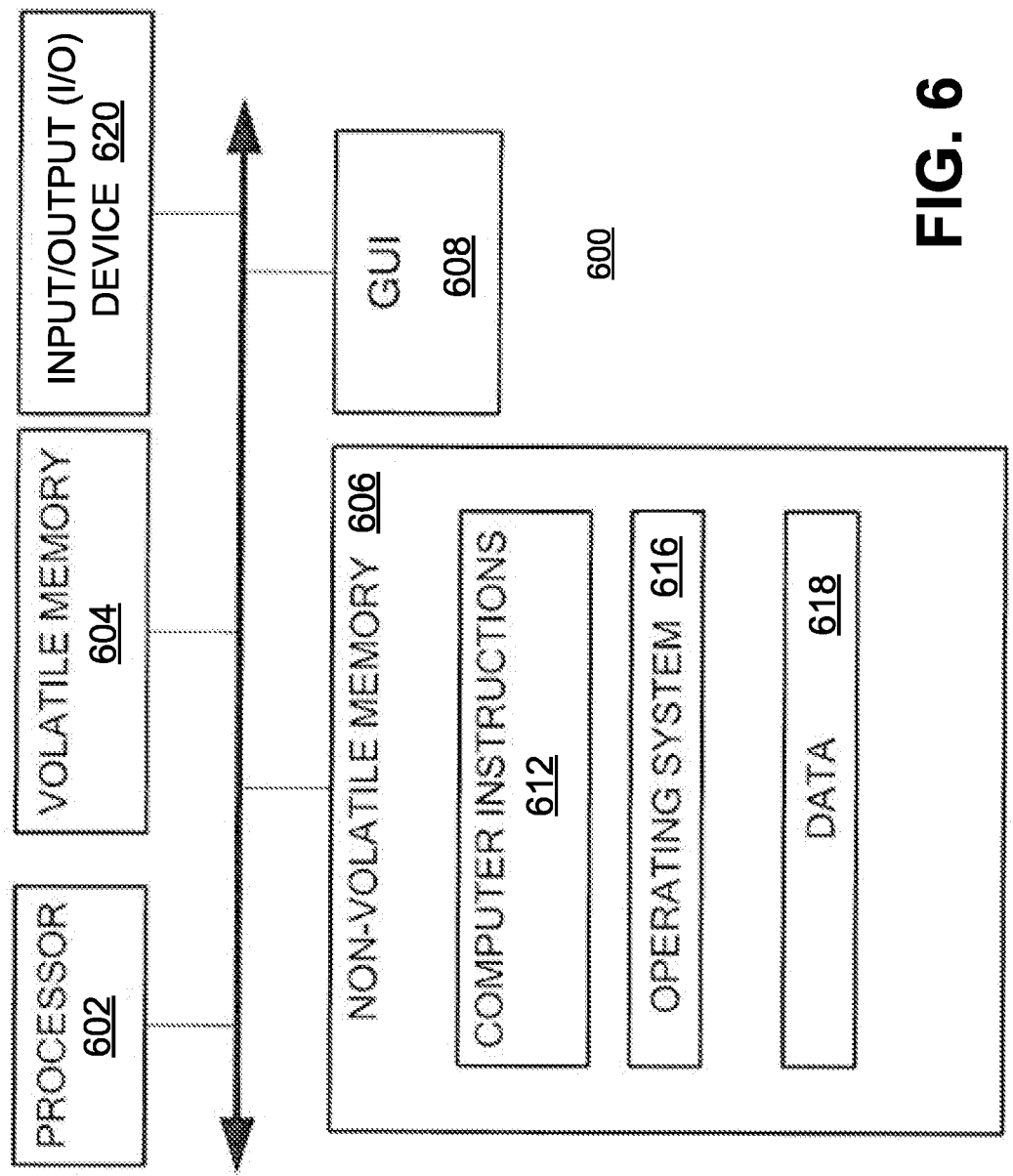
FIG. 6 is a diagram of an example of a computing device, according to aspects of the disclosure.

Referring to FIG. 6, in some embodiments, a computing device 600 may include processor 602, volatile memory 604 (e.g., RAM), non-volatile memory 606 (e.g., a hard disk drive, a solid-state drive such as a flash drive, a hybrid magnetic and solid-state drive, etc.), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604. Program code may be applied to data entered using an input device of GUI 608 or received from I/O device 620.

FIGS. 1-6 are provided as an example only. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The phrase "memory space of a guest operating system" may refer to volatile or non-volatile memory which the guest operating system (or applications running within the guest operating system) is allowed to access. As used herein, the terms "volume" and "data volume" are used interchangeably.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. (3/8)

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, comprising:
generating a replication configuration list for a first guest operating system, the replication configuration list identifying each of a plurality of Network Attached Storage (NAS) servers that are executed in the first guest operating system;
detecting a file system failure event that is associated with a failed file system, the failed file system being associated with a data volume, the failed file system being provided by a first NAS server;
identifying a file system identifier that is associated with the failed file system;
detecting whether the first NAS server is replicated based on the replication configuration list; and
in response to detecting that the first NAS server is replicated, performing a failover for the data volume to a second NAS server that is arranged to provide a file system for a replica of the data volume, wherein performing the failover includes causing the storage system to begin routing I/O requests for the data volume to the second NAS server,
wherein: the replication configuration list is generated by a first configuration builder that is executed in the first guest operating system, the replication configuration list identifying only NAS servers that are executed in the first guest operating system, the first guest operating system is executed on a storage processor that is configured to execute one or more second guest operating systems; and each second guest operating system is configured to execute respective second configuration builder, each second configuration builder being configured to generate a respective replication configuration list that is local to the second guest operating system executing the second configuration builder.

2. The method of claim 1, wherein:
the storage system includes a first storage system and a second storage system;
the first NAS server is executed on a first storage processor in the first storage system; and
the second NAS server is executed on a second storage processor in the second storage system.

3. The method of claim 1, further comprising generating a predetermined error when the first NAS server is not replicated.

4. The method of claim 1, wherein detecting whether the first NAS server is replicated includes detecting that the failed file system is executed by the first NAS server, and performing a search of the replication configuration list to detect whether the first NAS server is replicated.

5. The method of claim 1, further comprising:
detecting a first event indicating that a new replication session has started and adding a new entry to the list that corresponds to a NAS server that is associated with the new replication session; and
detecting a second event indicating that an existing replication session has been terminated and removing from the list an entry that corresponds to a NAS server that is associated with the terminated replication session.

6. The method of claim 1, wherein the replication configuration list identifies only NAS servers that are executed in the first guest operating system.

7. The method of claim 1, wherein the file system failure event includes one of: (i) a first type of event that is generated when a file system becomes unmounted, (ii) a second type of event that is generated when a file system is corrupted.

8. A computing device, comprising:
a memory; and
at least one processor that is operatively coupled to the memory, the at least one processor being configured to perform the operations of:
generating a replication configuration list for a first guest operating system, the replication configuration list identifying each of a plurality of Network Attached Storage (NAS) servers that are executed in the first guest operating system;
detecting a file system failure event that is associated with a failed file system, the failed file system being associated with a data volume, the failed file system being provided by a first NAS server;
identifying a file system identifier that is associated with the failed file system;
detecting whether the first NAS server is replicated based on the replication configuration list; and
in response to detecting that the first NAS server is replicated, performing a failover for the data volume to a second NAS server that is arranged to provide a file system for a replica of the data volume, wherein performing the failover includes causing a storage system of which the system is part to begin routing I/O requests for the data volume to the second NAS server,
wherein: the replication configuration list is generated by a first configuration builder that is executed in the first guest operating system, the replication configuration list identifying only NAS servers that are executed in the first guest operating system, the first guest operating system is executed on a storage processor that is configured to execute one or more second guest operating systems, and each second guest operating system is configured to execute respective second configuration builder, each second configuration builder being configured to generate respective replication configuration list that is local to the second guest operating system executing the second configuration builder.

9. The computing device of claim 8, wherein:
the storage system includes a first storage system and a second storage system;
the first NAS server is executed on a first storage processor in the first storage system; and
the second NAS server is executed on a second storage processor in the second storage system.

10. The computing device of claim 8, further comprising generating a predetermined error when the first NAS server is not replicated.

11. The computing device of claim 8, wherein detecting whether the first NAS server is replicated includes detecting that the failed file system is executed by the first NAS server, and performing a search of the replication configuration list to detect whether the first NAS server is replicated.

12. The computing device of claim 8, wherein the at least one processor is further configured to perform the operations of:
detecting a first event indicating that a new replication session has started and adding a new entry to the list that corresponds to a NAS server that is associated with the new replication session; and
detecting a second event indicating that an existing replication session has been terminated and removing from the list an entry that corresponds to a NAS server that is associated with the terminated replication session.

13. The computing device of claim 8, wherein the replication configuration list identifies only NAS servers that are executed in the first guest operating system.

14. The computing device of claim 8, wherein the file system failure event includes one of: (i) a first type of event that is generated when a file system becomes unmounted, (ii) a second type of event that is generated when a file system is corrupted.

15. A non-transitory computer-readable storage medium that is configured to store one or more processor-executable instructions, which when executed by at least one processor, cause the processor to perform the operations of:
generating a replication configuration list for a first guest operating system, the replication configuration list identifying each of a plurality of Network Attached Storage (NAS) servers that are executed in the first guest operating system;
detecting a file system failure event that is associated with a failed file system, the failed file system being associated with a data volume, the failed file system being provided by a first NAS server;
identifying a file system identifier that is associated with the failed file system;
detecting whether the first NAS server is replicated based on the replication configuration list, the first NAS server providing the failed file system; and
in response to detecting that the first NAS server is replicated, performing a failover for the data volume to a second NAS server that is arranged to provide a file system for a replica of the data volume, wherein performing the failover includes causing a storage system of which the at least one processor is part to begin routing I/O requests for the data volume to the second NAS server,
wherein: the replication configuration list is generated by a first configuration builder that is executed in the first guest operating system, the replication configuration list identifying only NAS servers that are executed in the first guest operating system, the first guest operating system is executed on a storage processor that is configured to execute one or more second guest operating systems, and each second guest operating system is configured to execute a respective second configuration builder, each second configuration builder being configured to generate a respective replication configuration list that is local to the second guest operating system executing the second configuration builder.

16. The non-transitory computer-readable storage medium of claim 15, wherein:
the storage system includes a first storage system and a second storage system;
the first NAS server is executed on a first storage processor in the first storage system; and
the second NAS server is executed on a second storage processor in the second storage system.

17. The non-transitory computer-readable storage medium of claim 15, further comprising generating a predetermined error when the first NAS server is not replicated.

18. The non-transitory computer-readable storage medium of claim 15, wherein detecting whether the first NAS server is replicated includes detecting that the failed file system is executed by the first NAS server, and performing a search of the replication configuration list to detect whether the first NAS server is replicated.

\* \* \* \* \*